United States Patent
Kawahara

(10) Patent No.: US 7,227,565 B2
(45) Date of Patent: Jun. 5, 2007

(54) ELECTRONIC APPARATUS EQUIPPED WITH IMAGE CAPTURING DEVICE AND MICROPHONE

(75) Inventor: Yoshio Kawahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 3 days.

(21) Appl. No.: 10/790,192

(22) Filed: Mar. 2, 2004

(65) Prior Publication Data

US 2004/0192421 A1 Sep. 30, 2004

(30) Foreign Application Priority Data

Mar. 31, 2003 (JP) .............................. 2003-095719

(51) Int. Cl.
*H04N 7/14* (2006.01)

(52) U.S. Cl. .............................. 348/14.02; 455/556.1

(58) Field of Classification Search .. 348/14.01–14.16, 348/333.06, 373, 240.99; 455/575.3, 575.4, 455/66.1, 550.1, 556.1, 556.2, 566
See application file for complete search history.

(56) References Cited

U.S. PATENT DOCUMENTS

| | | | | |
|---|---|---|---|---|
| 4,961,211 A * | 10/1990 | Tsugane et al. | ........... | 348/14.08 |
| 5,612,733 A * | 3/1997 | Flohr | ............... | 348/14.16 |
| 6,069,648 A * | 5/2000 | Suso et al. | ............... | 348/14.02 |
| 6,369,846 B1 * | 4/2002 | Katsumi | ................... | 348/14.01 |
| 6,567,677 B1 * | 5/2003 | Sokoloff | ................... | 455/575.1 |
| 6,714,238 B2 * | 3/2004 | Urisaka et al. | ......... | 348/14.05 |
| 6,741,873 B1 * | 5/2004 | Doran et al. | ............ | 455/569.1 |
| 7,002,616 B2 * | 2/2006 | Taneya et al. | ........... | 348/14.02 |
| 2001/0004269 A1 * | 6/2001 | Shibata et al. | ......... | 348/333.06 |
| 2001/0020975 A1 | 9/2001 | Kerai et al. | | |
| 2002/0075244 A1 * | 6/2002 | Tani et al. | ................... | 345/173 |
| 2003/0081120 A1 * | 5/2003 | Klindworth | ................. | 348/143 |
| 2004/0012701 A1 * | 1/2004 | Nagai et al. | ............ | 348/333.12 |
| 2004/0137958 A1 * | 7/2004 | Sawai | ........................ | 455/566 |
| 2004/0204194 A1 * | 10/2004 | Akai et al. | ............... | 455/575.1 |

FOREIGN PATENT DOCUMENTS

| | | | |
|---|---|---|---|
| JP | 06302169 A | * | 10/1994 |
| JP | 08-294030 | | 11/1996 |
| JP | 10-313452 | | 11/1998 |
| JP | 2000-332865 | | 11/2000 |
| JP | 2001-053905 | | 2/2001 |
| JP | 2001-136254 | | 5/2001 |
| JP | 2001169158 A | * | 6/2001 |
| JP | 2001-313697 | | 11/2001 |

(Continued)

*Primary Examiner*—Stella Woo
(74) *Attorney, Agent, or Firm*—Arent Fox LLP

(57) ABSTRACT

In a mobile telephone including a camera 2a and a microphone 4 loaded in front, and a camera 2b on the back, the sensitivity of the microphone 4 is set at a normal level when the camera 2a is selected, and the sensitivity of the microphone 4 is enhanced when the camera 2b is selected so that the conventional problems can be solved. To attain this, an electronic apparatus such as a mobile telephone, a PHS, a PDA, etc. capable of capturing a moving picture and a still image is loaded with a camera and a microphone capable of easily and clearly collecting voice from all directions when a user who is taking a picture captures an image in front of the user, the user himself or herself, or a target in a different direction.

4 Claims, 12 Drawing Sheets

FOREIGN PATENT DOCUMENTS

| | | | |
|---|---|---|---|
| JP | 2002-111801 | | 4/2002 |
| JP | 2002237985 A | * | 8/2002 |
| JP | 2004166159 A | * | 6/2004 |
| KR | 2004016477 A | * | 2/2004 |
| WO | WO 2003065692 A1 | * | 8/2003 |

* cited by examiner

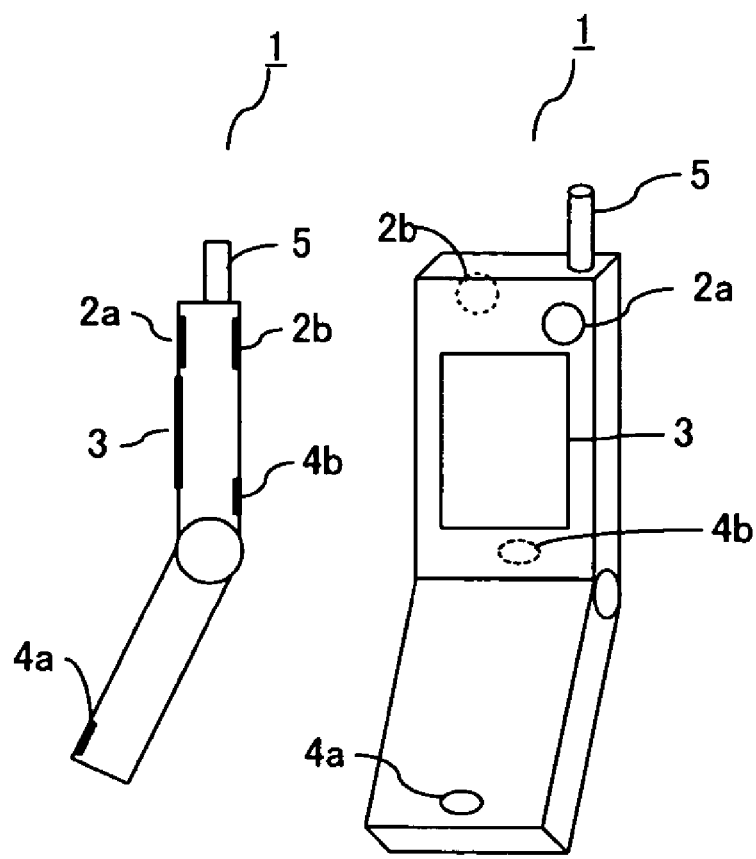
F I G. 3

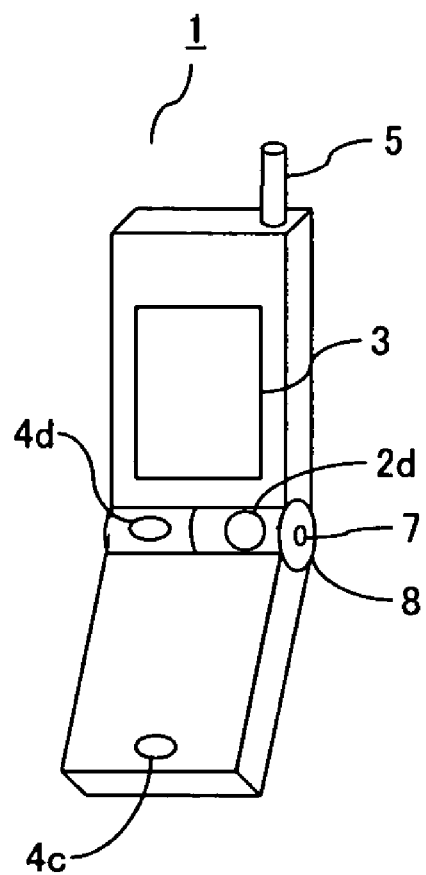
F I G. 6

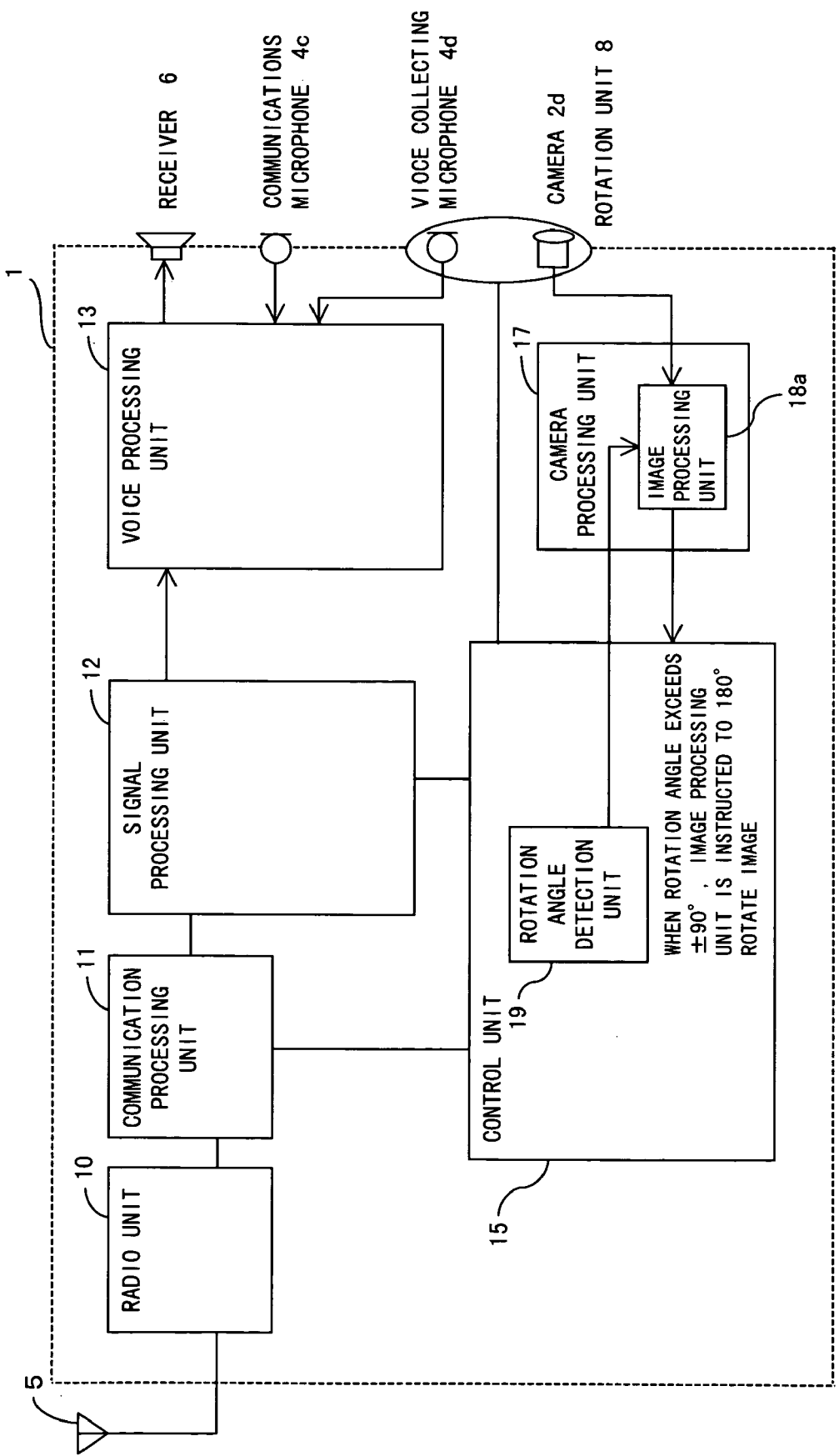
F I G. 8

ELECTRONIC APPARATUS EQUIPPED WITH IMAGE CAPTURING DEVICE AND MICROPHONE

BACKGROUND OF THE INVENTION

1. Field of the Invention

The present invention relates to an electronic apparatus such as a mobile telephone, a PHS (personal handyphone system), a PDA (personal digital assistant), etc. loaded with a camera and a microphone.

2. Description of the Related Art

When a user who is taking a picture takes a moving picture using a mobile telephone, which is loaded with a camera and a microphone, capable of taking a moving picture while checking the picture on the display of the mobile telephone, the following process has been performed to realize capturing an image in front of the user, and capturing an image of the user himself, or herself or in other directions.

FIG. 1A shows an example (1) of the conventional mobile telephone. In FIG. 1A, a conventional mobile telephone 101 is loaded with a communications/sound collecting microphone 104 (a display 103 faces in the same direction), and one camera set in the same direction as the display 103 and one opposite to the display 103 (cameras 102a and 102b).

FIG. 1B shows an example (2) of the conventional mobile telephone (literature 1). In FIG. 1B, in addition to a communications microphone (not shown in the attached drawings), a module 105 in which a microphone and a camera are incorporated into one unit can be detached from the body of the mobile telephone 101.

FIG. 1C shows an example (3) of the conventional mobile telephone (literature 2). In FIG. 1C, the mobile telephone 101 is formed by an upper portion 101a, a middle portion 101b, and a lower portion 101c which are connected through coupling units 106a and 106b. A camera 102 is mounted on the side of the upper portion 101a, and the microphone 104 is mounted on the lower portion 101c. Since the coupling units 106a and 106b can be rotated, the directions of the camera 102 and the microphone 104 can be changed.

Literature 1 Japanese Patent Application Laid-open No. 2001-53905

(pages 1 through 3, FIGS. 1 and 2)

Literature 2 Japanese Patent Application Laid-open No. Hei 10-313452

(pages 1 through 6, FIGS. 1 through 8)

However, in FIG. 1A, when a moving picture is taken, the sensitivity of a microphone is constant regardless of which camera is to be used, the camera 102a of the camera 102b. Therefore, when a picture is taken using the camera 102b loaded in one direction while the microphone 104 is loaded in the opposite direction, the voice level is lower than the camera 102a loaded in the same direction as the microphone 104 although the distance between the mobile telephone 101 and the person whose image is captured is the same.

In FIG. 1B, for example, when the user who is taking a picture takes a picture of himself or herself while watching the display 103, the mobile telephone 101 and the camera unit 105 are to be held by the user, and inconveniently require both hands of the user.

Additionally, a camera having a built-in microphone is designed to fix the microphone and the camera in the same direction. Therefore, the sound can be collected only from the direction of the camera. For example, when the voice of the user who is taking a picture is collected while the user is taking a picture in the direction the user faces, the voice level is low for the above-mentioned reason.

Furthermore, in FIG. 1C, since the microphone 104 and the camera 102 are loaded on the different movable parts, they have to be independently adjusted in direction when the direction of a picture to be taken is changed, which causes inconvenience to the user.

SUMMARY OF THE INVENTION

The present invention aims at realizing an electronic apparatus such as a mobile telephone, a PHS, a PDA, etc. capable of taking a moving picture and a still image in the direction the user who is taking a picture faces, and taking a moving picture and a still image of the user himself or herself or anything else in other directions with the voice collected clearly and easily collected from all directions using a camera and a microphone incorporated into the electronic apparatus.

To attain the above-mentioned object, the electronic apparatus according to the present invention includes:

a plurality of capture units, fixed in different directions, for capturing a target object;

a voice input unit for inputting voice;

a selection unit for selecting one of the plurality of capture units; and a sensitivity control unit for controlling the sensitivity of the voice input unit based on the selection unit.

To attain the above-mentioned object, the electronic apparatus according to the present invention includes:

a first capture unit, fixed in the same direction as the display unit, for capturing a target object in that direction;

a second capture unit, fixed in one direction while the display unit is fixed in the opposite direction, for capturing a target object in the former direction;

a voice input unit for inputting voice;

a selection unit for selecting the first capture unit or the second capture unit; and a sensitivity control unit for controlling the sensitivity of the voice input unit based on the selection unit.

To attain the above-mentioned object, the electronic apparatus according to the present invention includes:

a plurality of capture units for capturing a target object;

voice input units, equal in number to the plurality of capture units, for inputting voice corresponding to the respective capture units;

a selection unit for selecting one of the plurality of capture units; and a control unit for controlling the plurality of voice input units based on the selection unit.

To attain the above-mentioned object, the electronic apparatus according to the present invention includes:

a capture unit for capturing a target object;

a plurality of voice input units for inputting voice; and a voice obtaining unit for obtaining predetermined voice when the voice is input to the voice input unit.

To attain the above-mentioned object, the electronic apparatus according to the present invention includes:

a capture unit for capturing a target object;

a voice input unit for inputting voice; and a rotation unit for rotating the capture unit and the voice input unit with the relative position between the capture unit and the voice input unit maintained.

To attain the above-mentioned object, the electronic apparatus according to the present invention includes:

a capture unit for capturing a target object;

a voice input unit for inputting voice;

a rotation unit for rotating the capture unit; and a sensitivity control unit for controlling the sensitivity of the voice input unit based on the rotation angle of the rotation unit.

To attain the above-mentioned object, the electronic apparatus according to the present invention includes:

a capture unit for capturing a target object;

a first voice input unit, fixed in the same direction as a display unit, for inputting the voice in the direction;

a second voice input unit, fixed in one direction while the display unit is fixed in the opposite direction, for inputting the voice in the direction;

a rotation unit for rotating the capture unit; and a voice input control unit for controlling the first voice input unit and the second voice input unit to obtaining voice from the direction of the first voice input unit or the second voice input unit based on the rotation angle of the rotation unit.

BRIEF DESCRIPTION OF THE DRAWINGS

FIG. 3 shows the outline of the appearance of the mobile telephone according to the second embodiment of the present invention;

FIG. 6 shows the outline of the appearance of the mobile telephone according to the fourth embodiment of the present invention;

FIG. 8 shows the outline of the internal configuration of the mobile telephone according to the fourth embodiment of the present invention.

DESCRIPTION OF THE PREFERRED EMBODIMENTS

Figure 1A:
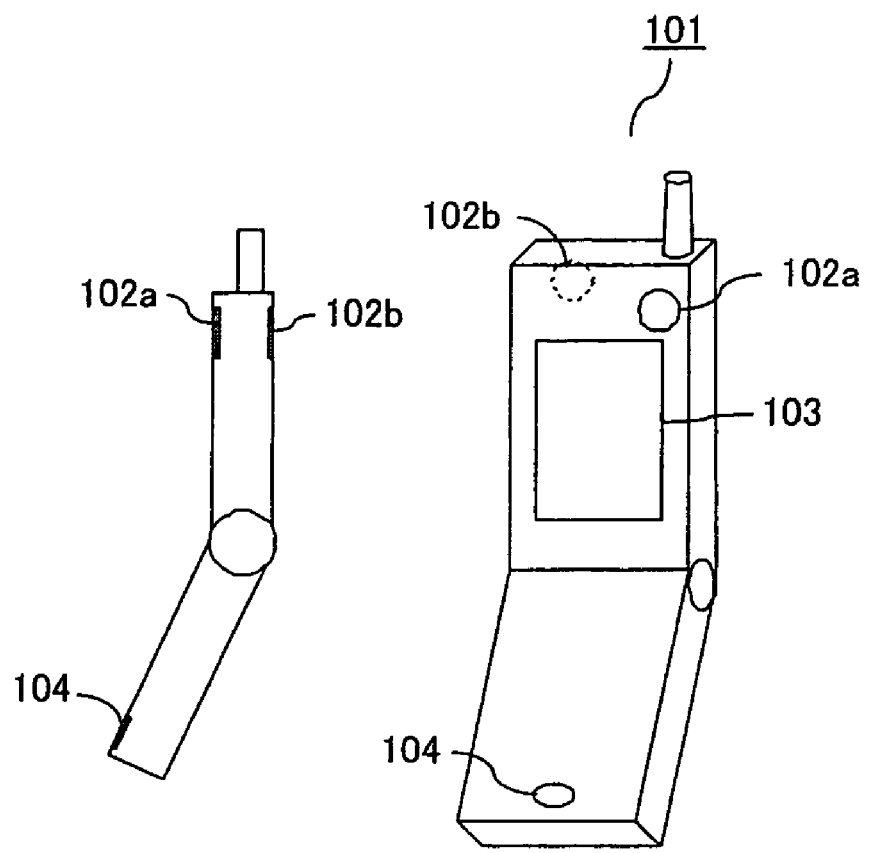
FIG. 1A shows an example (1) of a conventional mobile telephone.
Figure 1B:
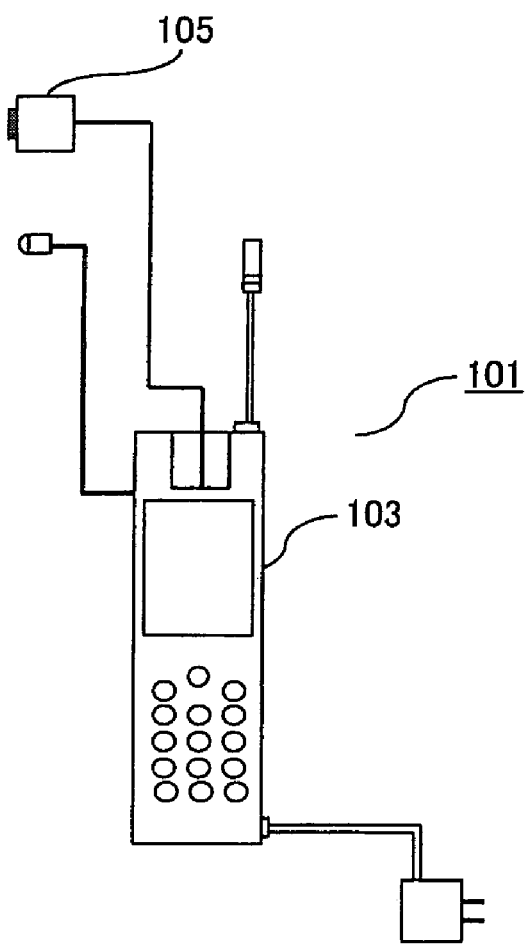
FIG. 1B shows an example (2) of a conventional mobile telephone.
Figure 1C:
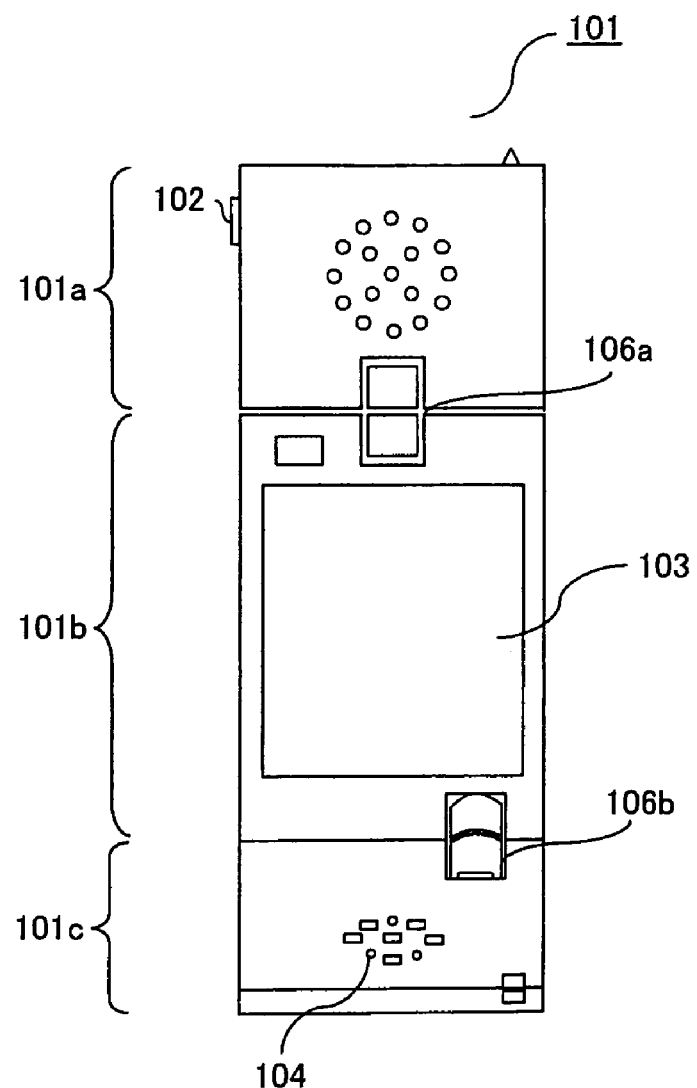
FIG. 1C shows an example (3) of a conventional mobile telephone.

The electronic apparatus according to the first embodiment of the present invention comprises:

a plurality of capture units, fixed in different directions, for capturing a target object;

a voice input unit for inputting voice;

a selection unit for selecting one of the plurality of capture units; and a sensitivity control unit for controlling the sensitivity of the voice input unit based on the selection unit.

With the above-mentioned configuration, voice can be collected at the same level as long as the distance between the electronic apparatus and a target object is the same regardless of an available camera.

In the electronic apparatus according to the first embodiment of the present invention, the sensitivity control unit controls the sensitivity of the voice input unit based on the relative angle between the direction of the capture unit selected by the selection unit and the direction of the voice input unit.

With the above-mentioned configuration, the sensitivity of the microphone can be adjusted based on the relative angle between the capture direction of an available camera and the voice collection direction of a microphone.

According to the first embodiment of the present invention, if a camera is fixed in the same direction as a display, another camera is fixed in that direction while the display is fixed in the opposite direction, and a picture is taken using a mobile telephone loaded with only one microphone for communications and collecting voice, then the sensitivity of the microphone is changed depending on the camera used in capturing a picture.

That is, when a camera collects voice for its microphone and takes a picture in the same direction, the voice of a target object (in this case, the user who is taking a picture) can be collected at an acceptable level even though the sensitivity of the microphone is at a normal level. When a camera collects voice for its microphone and takes a picture in the opposite direction, the sensitivity of the microphone is enhanced to collect the voice at an acceptable level even though the microphone does not face a target object.

The electronic apparatus according to the second embodiment of the present invention comprises:

a plurality of capture units for capturing a target object;

voice input units, equal in number to the plurality of capture units, for inputting voice corresponding to the respective capture units;

a selection unit for selecting one of the plurality of capture units; and a control unit for controlling the plurality of voice input units based on the selection unit.

With the above-mentioned configuration, the voice of a target object can be constantly and clearly collected regardless of the direction of the camera.

According to the second embodiment of the present invention, microphones equalling in number to the loaded cameras are provided (one of which is used in communications/voice collection), and the mobile telephone uses each set of a microphone and a camera to respectively collect voice and capture an image in the same direction. When an image is captured using one camera, only the microphone corresponding the camera is operated. Thus, the voice of a target object can be clearly collected with any camera used in capturing an image.

The electronic apparatus according to the third embodiment of the present invention comprises:

a capture unit for capturing a target object;

a plurality of voice input units for inputting voice; and a voice obtaining unit for obtaining predetermined voice when the voice is input to the voice input unit.

With the above-mentioned configuration, the voice of the speakers in all directions can be clearly collected at a constant level without collecting excess background noise regardless of an available camera and its direction.

According to the third embodiment of the present invention, when an image is captured using a mobile telephone loaded with one or more cameras and a plurality of microphones, all microphones can be operated. However, in this case, the voice input level is normally turned to the mute level to avoid collecting excess surrounding noise. Only when predetermined voice is input, the mute state is released and the voice is collected.

Thus, excess noise is not collected, and the voice of speakers as well as the target object can be clearly collected at a constant level even though the capture direction is constant and the speakers are located in all directions.

The electronic apparatus according to the fourth embodiment includes:

a capture unit for capturing a target object;

a voice input unit for inputting voice; and a rotation unit for rotating the capture unit and the voice input unit with the relative position between the capture unit and the voice input unit maintained.

With the above-mentioned configuration, the voice of a target object is constantly collected and the target object can be easily switched, thereby providing convenience for the user.

According to the fourth embodiment of the present invention, a mobile telephone is loaded with a capturing camera and a microphone in addition to a communications microphone. Therefore, the capturing camera and the microphone can be independently or cooperatively rotated. Whether they are independently or cooperatively rotated depends on the user option selected by a switching mechanism.

Since the camera and the microphone can be cooperatively rotated, a switch can immediately work when the state of capturing an image in the direction in which the user who is taking a picture watches is switched into the state of capturing the user himself or herself.

Described below is each embodiment of the present invention.

<First Embodiment>

According to the first embodiment, a camera fixed in the direction in which the display is fixed, a camera fixed opposite the display unit in direction, and only one communications/voice collection microphone are loaded on a mobile telephone.

Figure 2A:
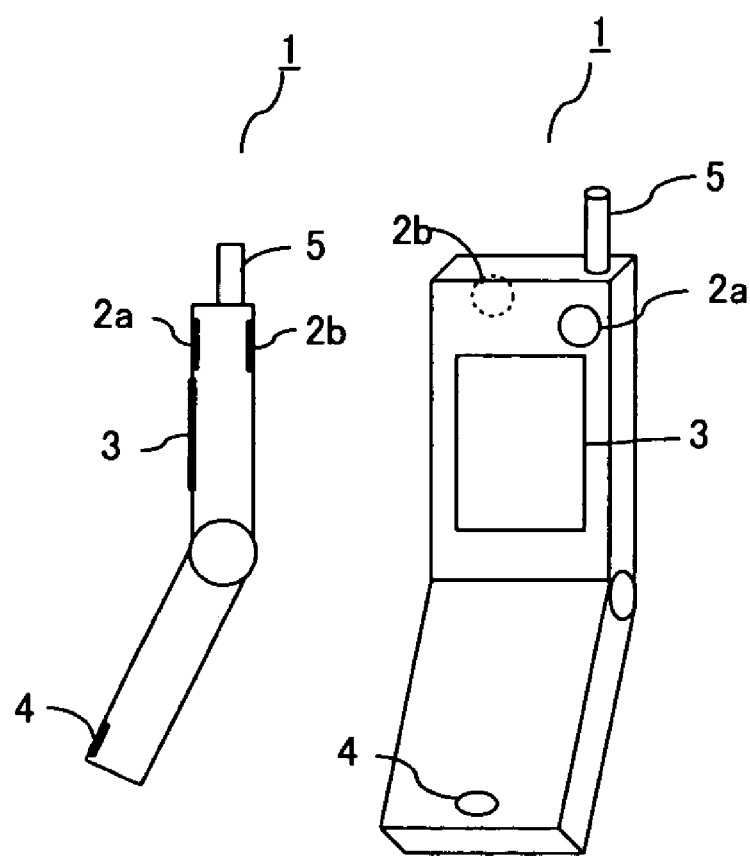
FIG. 2A shows the outline of the appearance of the mobile telephone according to the first embodiment of the present invention.

FIG. 2A shows the outline of the appearance of the mobile telephone according to the present embodiment. In FIG. 2A, a mobile telephone 1 is loaded with a display 3, a camera 2a, and a communications/voice collection microphone 4 in front, and a camera 2b at the back. Furthermore, relating to the relative position among the cameras 2a and 2b and the microphone 4, the camera 2a is fixed in the position such that an image is captured and voice is collected by the microphone 4 in the same direction. The camera 2b is fixed in a position such that an image is captured and voice is collected by the microphone 4 in the opposite direction.

When the camera 2a in which voice is collected by the microphone 4 and an image is captured in the same direction is used, voice is collected based on the normal sensitivity of the microphone using the microphone 4. When the camera 2b in which voice is collected by the microphone 4 and an image is captured in the opposite direction is used, voice is collected by the microphone 4 with the sensitivity of the microphone set higher than a normal state by changing a set value for the internal electronic volume.

Figure 2B:
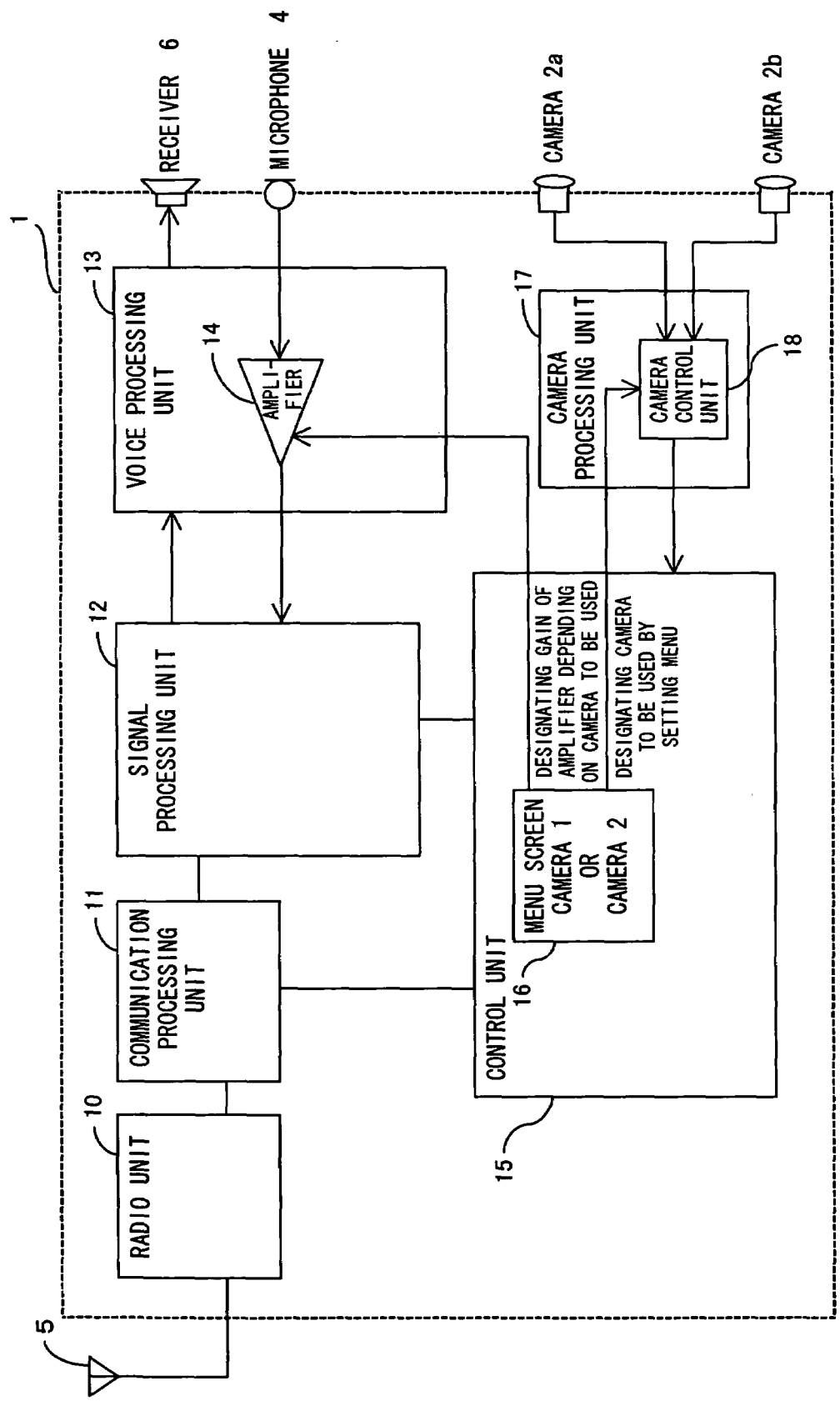
FIG. 2B shows the outline of the internal configuration of the mobile telephone according to the first embodiment of the present invention.

FIG. 2B shows the outline of the internal configuration of the mobile telephone according to the present embodiment. In FIG. 2B, the mobile telephone 1 comprises the cameras 2a and 2b, the microphone 4, an antenna 5, a receiver 6, a radio unit 10, a communication processing unit 11, a signal processing unit 12, a voice processing unit 13 comprising an amplifier 14, a control unit 15, and a camera processing unit 17 comprising a camera control unit 18.

The microphone 4 converts an input sound into an audio signal which is an analog signal. The receiver 6 is an earphone, a speaker, etc. for converting an audio signal received from the voice processing unit 13 into a sound.

An audio signal input from the microphone 4 is A/D converted by the voice processing unit 13 into audio data which is a digital signal, and is compressed by the signal processing unit 12. The audio data compressed by the signal processing unit 12 is converted into a wireless transmission format by the communication processing unit 11, modulated by the radio unit 10, and transmitted to a base station through the antenna 5. The camera processing unit 17 processes an image captured by the cameras 2a and 2b.

Described below is the operation according to the present embodiment. First, the user designates on a menu screen 16 displayed on the display 3 which camera is to be used, the camera 2a or the camera 2b. When a camera to be used is designated, the control unit 15 notifies the camera control unit 18 of the designation information. According to the designation information, the camera control unit 18 sets a camera to be used. The control unit 15 adjusts the gain of the amplifier 14 depending on the designated camera.

At this time, if the camera 2a in which the microphone collects voice and an image is captured in the same direction is designated, then a predetermined gain (for example, the gain during the communications, the gain during the collection of voice) is set. If the camera 2b in which the microphone collects voice and an image is captured in the opposite direction is designated, then a gain is set to a value relatively larger than the gain set for the camera 2a.

According to the present embodiment, the sensitivity of a microphone is changed by changing the gain of an amplifier. However, it is not limited to this method if the sensitivity of a microphone can be changed.

According to the present embodiment, the camera 2a and the microphone 4 are attached to the front of the mobile telephone, and camera 2b is attached to the back of the mobile telephone. However, the present invention is not limited to this configuration, and two or more cameras can be provided. For example, described below is a mobile telephone comprising a camera on each of the front, the side, and the back of the mobile telephone (a microphone is attached to the front). When the camera on the front is selected, the sensitivity of the microphone is set at a normal level. When the camera on the side is selected, the sensitivity of the microphone is set at a higher level. When the camera on the back is selected, the sensitivity of the microphone is set at an even higher level.

That is, the larger the relative angle between the direction in which the microphone collects voice and the direction in which the camera captures an image, the harder the collection of voice, which travels in the direction of capturing an image, by the microphone. Therefore, the sensitivity of the microphone is set higher.

Thus, a camera facing in the direction of the display and a camera opposite in direction to the display are loaded. Only one communications/voice collection microphone is loaded on the mobile telephone. With this configuration, voice can be collected at a constant level so far as the distance between the mobile telephone and a target object is maintained regardless of an available camera.

<Second Embodiment>

According to the present embodiment, microphones equal in number to the cameras loaded on a mobile telephone are provided (one of the microphones is used for communications/voice collection), and each set of a microphone and a camera facing in the same directions is attached to the mobile telephone.

FIG. 3 shows the outline of the appearance of the mobile telephone according to the present invention. In FIG. 3, the camera 2a and a microphone 4a are attached such that the camera 2a captures an image and the microphone 4a collects voice in the same direction. Similarly, the camera 2b, and a microphone 4b are attached such that the camera 2b captures an image and the microphone 4b collects voice in the same direction. Thus, there is a pair of the camera 2a and the microphone 4a, and a pair of the camera 2b and the microphone 4b.

In the present embodiment, a capture mode can be selected from a plurality of capture modes. In the present embodiment, when an image is captured using the camera 2a, the microphone 4a collects voice. When an image is captured using the camera 2b, the microphone 4b collects voice.

Figure 4:
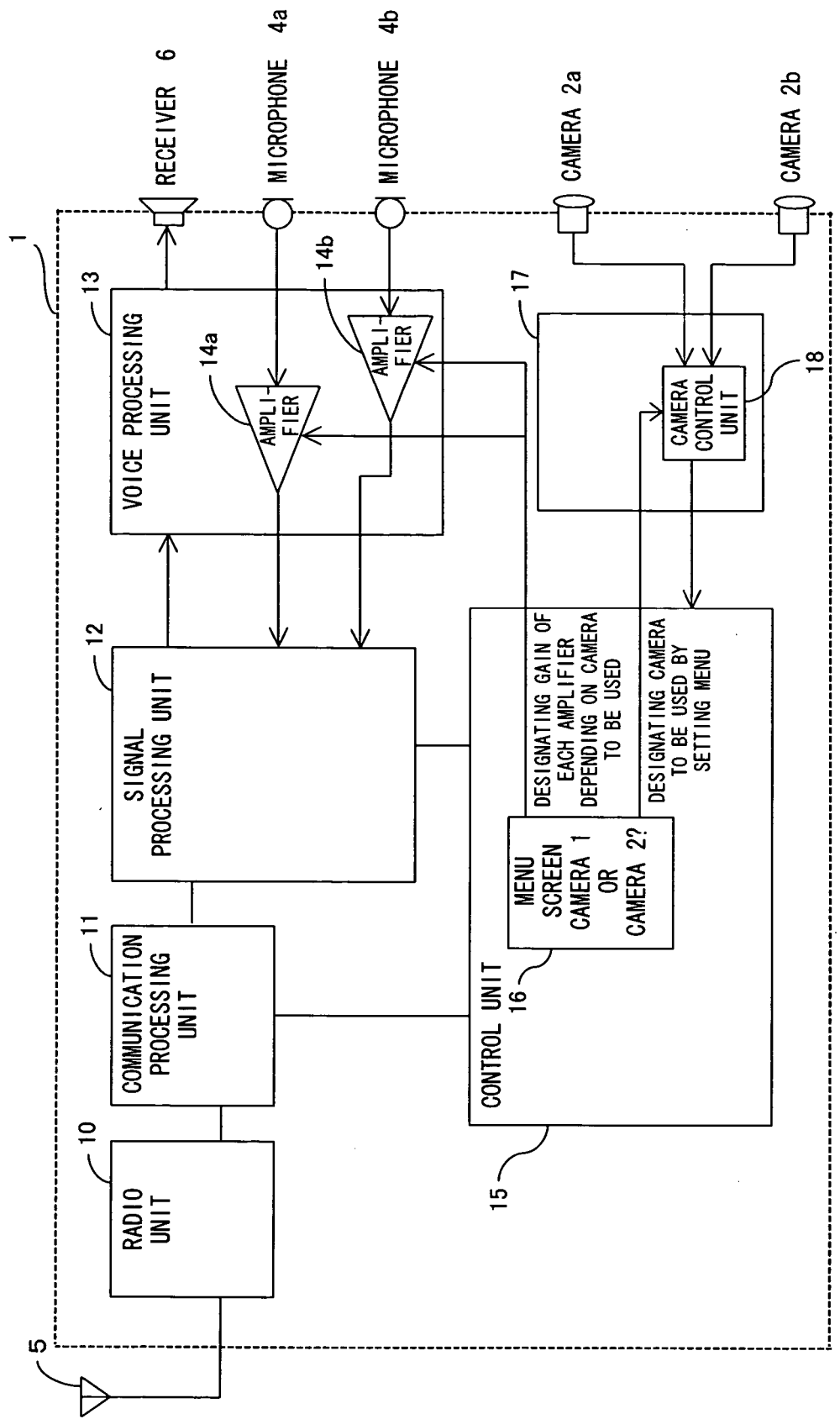
FIG. 4 shows the outline of the internal configuration of the mobile telephone according to the second embodiment of the present invention.

FIG. 4 shows the outline of the internal configuration of the mobile telephone according to the present embodiment. Unlike the first embodiment, two microphones (microphones 4a and 4b) are provided, and amplifiers 14a and 14b are provided for the respective microphones in the voice processing unit 13. First, the user designates on the menu screen 16 displayed on the display 3 which is to be used, the camera 2a or the camera 2b.

When a camera to be used is designated, the control unit 15 notifies the camera control unit 18 of the designation information. According to the designation information, the camera control unit 18 sets the camera to be used. The control unit 15 specifies the gain of the amplifier 14 corresponding to the designated camera.

If the camera 2a is designated, the gain of the amplifier 14a corresponding to the microphone 4a for which the camera 2a captures an image and voice is collected in the same direction is increased (or set in an operating state) while the gain of the other amplifier 14b is decreased (or the amplifying operation is stopped). Similarly, if the camera 2b is designated, the gain of the amplifier 14b corresponding to the microphone 4b for which the camera 2b captures an image and voice is collected in the same direction is increased (or set in an operating state) while the gain of the other amplifier 14a is decreased (or the amplifying operation is stopped).

Thus, the voice is collected only from the microphone corresponding to the camera to be used, and the collection of voice from the other microphone is stopped. Otherwise, the sensitivity of the microphone corresponding to the camera to be used is set at predetermined sensitivity of microphone, and the sensitivity of the other microphone is reduced correspondingly.

As described above, in a mobile telephone in which the microphones equal in number to the cameras are loaded on the mobile telephone, and a set of a microphone and a camera face in the same direction, the voice of a target object to be captured can be clearly collected constantly regardless of cameras when a camera is used and a corresponding microphone is operated.

<Third Embodiment>

The present embodiment is one of the plurality of capture modes according to the second embodiment. According to the present embodiment, a mobile telephone comprises a plurality of microphones (one of which is a communications/voice collection microphone), and operates only a microphone in which predetermined voice is input.

The appearance of the mobile telephone according to the present embodiment is the same as that shown in FIG. 3. In the present embodiment, one of the plurality of capture modes can be selected. In one of the modes, the microphones 4a and 4b are operated when any one of the cameras 2a and 2b is used. However, to avoid inputting the background noise, the microphones 4a and 4b are set in a mute state for collected voice. Then, the input voice from each microphone is determined by a DSP (digital signal processor) and recognized as voice. That is, only when the input level of each microphone exceeds a threshold, the input from the microphone is released from the mute state.

Figure 5:
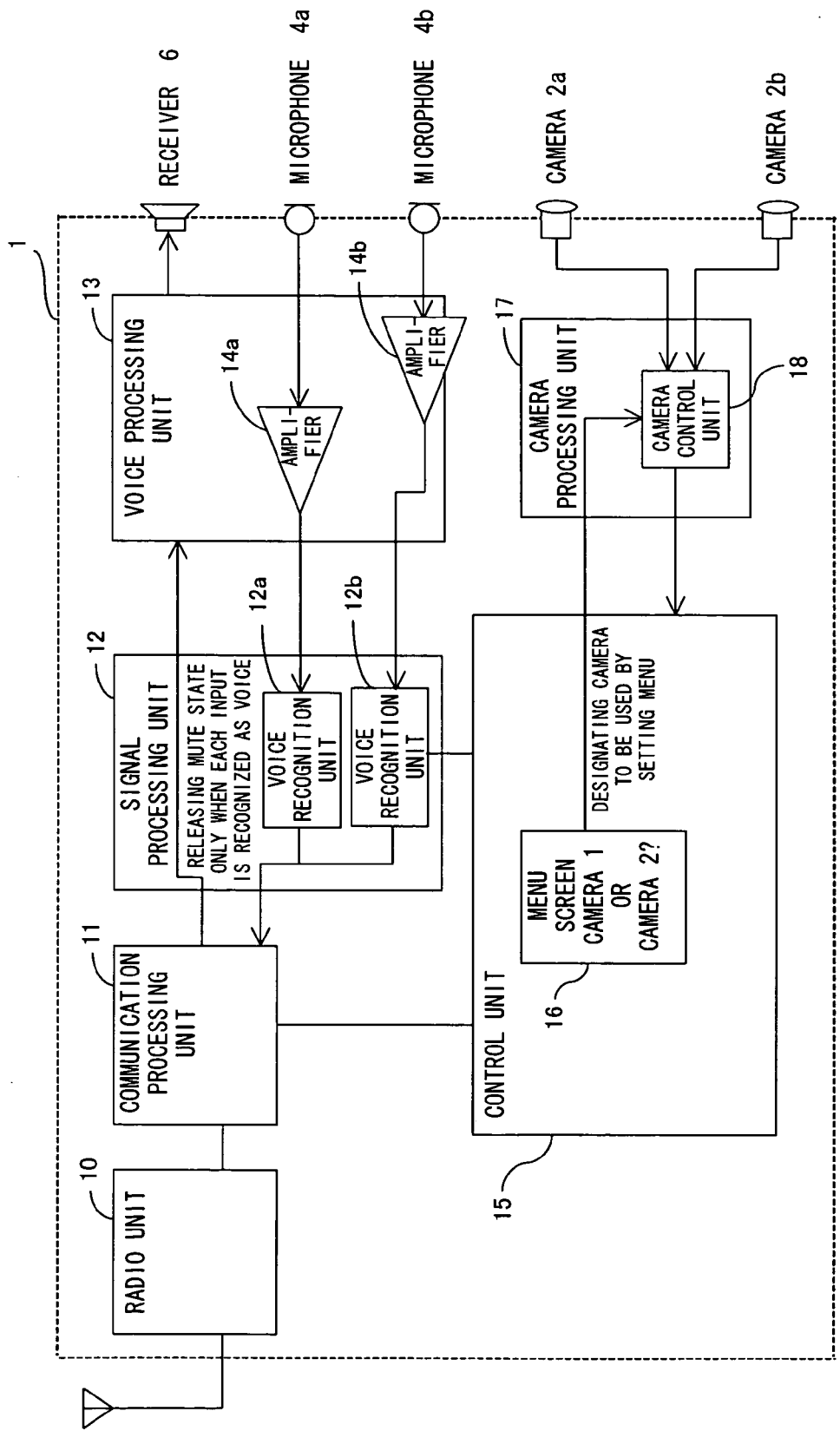
FIG. 5 shows the outline of the internal configuration of the mobile telephone according to the third embodiment of the present invention.

FIG. 5 shows the outline of the internal configuration of the mobile telephone according to the present embodiment. Unlike the second embodiment, the signal processing unit 12 comprises a voice recognition unit 12a corresponding to the amplifier 14a and a voice recognition unit 12b corresponding to the amplifier 14b.

First, the user designates on the menu screen 16 displayed on the display 3 the camera 2a or the camera 2b to be used. When a camera to be used is designated, the control unit 15 notifies the camera control unit 18 of the designation information. According to the designation information, the camera control unit 18 sets the camera to be used.

Regardless of the setting of the camera, the microphones 4a and 4b are set in the mute state. Practically, the gains of the amplifiers 14a and 14b are set at a normal level, and the amplifiers are set in the mute state by the signal processing unit 12. For example, when voice is input from the microphone 4a, the audio data A/D converted by the voice processing unit 13 is transmitted to the voice recognition unit 12a. The voice recognition unit 12a transmits only the signal exceeding a predetermined threshold to the communication processing unit 11 or the storage unit (not shown in the attached drawings).

As described above, regardless of the camera to be used and its direction, the voice of the speakers in all directions can be clearly collected at a constant level without collecting excess background noise.

<Fourth Embodiment>

According to the present embodiment, a mobile telephone is loaded with a communications microphone, a camera which can be rotated and captures an image, and a microphone which can also be rotated.

FIG. 6 shows the outline of the appearance of the mobile telephone according to the present embodiment. In FIG. 6, the mobile telephone 1 is loaded with a communications microphone 4c, a camera 2d which can be rotated and captures an image, and a microphone 4d which can also be rotated and collects voice. It also comprises the display 3, the antenna 5, and a rotation unit 8. The rotation unit 8 comprises rotation units 8a and 8b. The camera 2d is attached to the rotation unit 8a, and the microphone 4d is attached to the rotation unit 8b.

The camera 2d and the microphone 4d can be independently or cooperatively rotated by ±180° about the body of the mobile telephone on the horizontal axis. The operation can be switched by the user selection using a switch 7. When the switch 7 is pressed, the rotation units 8a and 8b are interlocked. When the switch 7 is pressed again, the interlock can be released.

By pressing the switch 7, the rotation units 8a and 8b are interlocked, but the rotation unit 8 can be rotated. That is, the switch 7 interlocks the rotation units 8a and 8b to hold the relative position angle between the camera 2d and the microphone 4d.

Furthermore, to match in direction the display of the captured image, the display direction is rotated by 180° between the case in which the display 3 displays the screen and the camera 2d captures an image in the same direction and the case in which the display 3 displays the screen and the camera 2d captures an image in the opposite directions.

Figure 7:
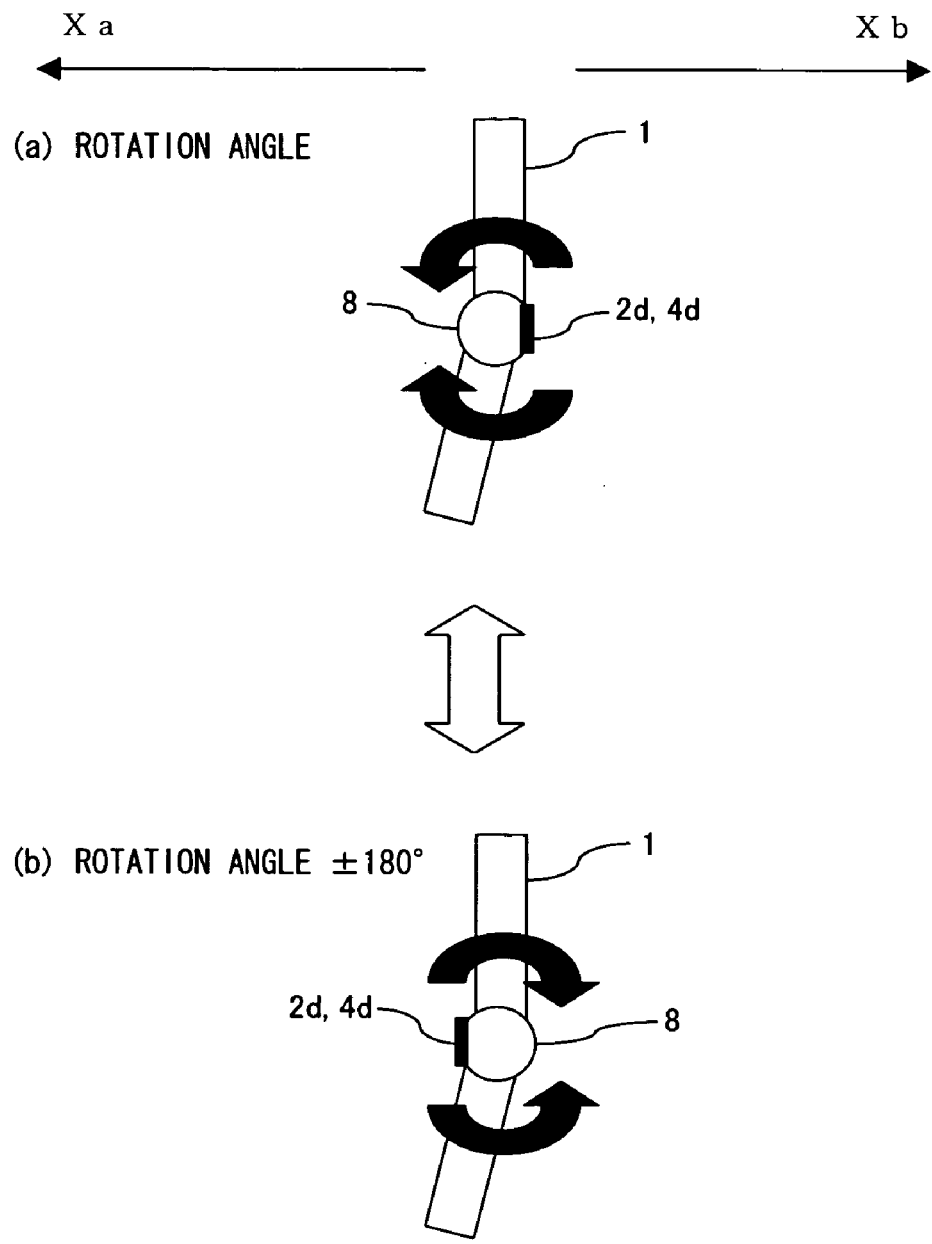
FIG. 7 shows the operation of the rotation unit according to the fourth embodiment of the present invention.

FIG. 7 shows the operation of the rotation unit 8 capable of rotating the camera 2d and the microphone 4d independently or cooperatively by ±180° about the body of the mobile telephone on the horizontal axis. According to the present embodiment, the switch 7 adjusts the camera 2d and the microphone 4d to be cooperatively rotated. The camera 2d and the microphone 4d face in the same direction.

When an image is captured in the Xb direction, the camera 2d and the microphone 4d face in the Xb direction ((a) in FIG. 7). For example, the rotation angle of the rotation unit 8 is assumed to be 0° about the horizontal plane. Then, when an image is captured in the Xa direction (when the user who is taking a picture is captured), the rotation unit 8 is rotated by ±180° so that the camera 2d and the microphone 4d can be directed in the Xa direction (in the direction of the user who is taking a picture) ((b) in FIG. 7).

FIG. 8 shows the outline of the internal configuration of the mobile telephone according to the present embodiment. Unlike the first embodiment, the mobile telephone comprises the rotation unit 8 including the voice collecting microphone 4d and the camera 2d. The control unit 15 comprises a rotation angle detection unit 19 for detecting the rotation angle of the rotation unit 8. The rotation unit 8 can be rotated by ±180° about the body of the mobile telephone 1 on the horizontal axis.

Described below is the operation according to the present embodiment. First, an image is captured in a direction, and then captured in the opposite direction, a rotation unit 20 is rotated by ±180° about the body of the mobile telephone 1 on the horizontal axis. Then, the camera 2d fixed to the rotation unit 20 is also rotated by ±180° about the body of the mobile telephone 1 on the horizontal axis.

At this time, when the rotation angle detection unit 19 is set at the rotation angle of 0~±90° and ±90~±180°, captured images are inverted to each other. When the rotation angle exceeds ±90°, the rotation angle detection unit 19 detects it. According to the detected information, the control unit 15 issues an instruction to the image processing unit 18a to rotate the captured image by 180° on the horizontal axis. At the instruction, the image processing unit 18a rotates the captured image by 180° on the horizontal axis.

Figure 9:
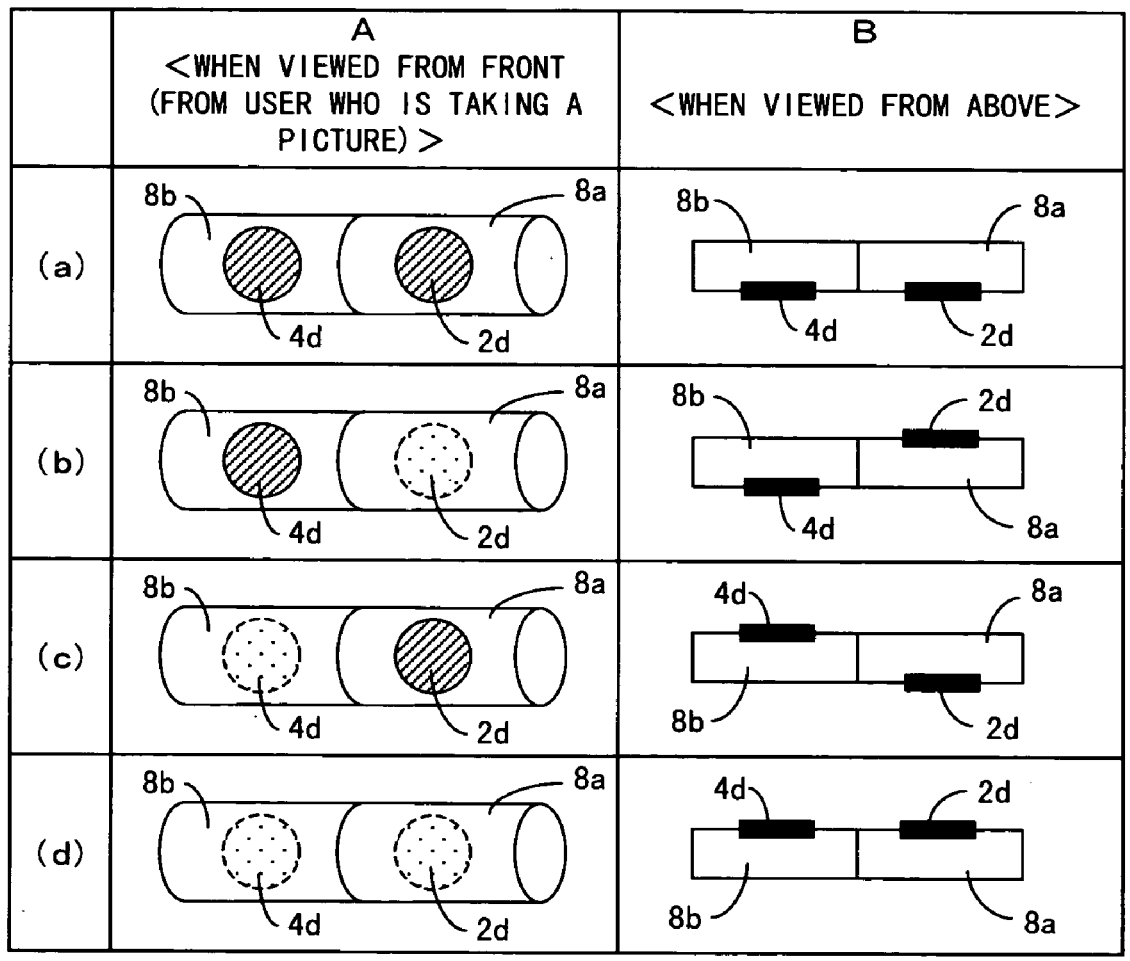
FIG. 9 shows an example of a rotation pattern of the rotation unit according to the fourth embodiment of the present invention.

FIG. 9 shows an example of a rotation pattern of the rotation unit 8 according to the present embodiment. In FIG. 9, the rotation patterns (a), (b), (c), and (d) are presented, and each pattern is shown in the cases A (when the rotation unit is viewed from the front of the mobile telephone 1 (from the user who is taking a picture)) and B (when the rotation unit is viewed from above the mobile telephone 1).

(a) in FIG. 9 shows the case in which the camera 2d and the microphone 4d face the user who is taking a picture. It is a rotation pattern in which the user who is taking a picture captures an image while collecting the user's voice.

(b) in FIG. 9 shows the case in which the microphone 4d faces the user who is taking a picture, and the camera 2d and the user who is taking a picture face in the opposite directions. It is a rotation pattern in which the user who is taking a picture captures a target object in front of the user while collecting the user's voice.

(c) in FIG. 9 shows the case in which the camera 2d faces the user who is taking a picture, and the microphone 4d and the user who is taking a picture face in the opposite directions. It is a rotation pattern in which the user captures an image of himself or herself while collecting the voice of a person in front of the user.

(d) in FIG. 9 shows the case in which the camera 2d and the microphone 4d face in the same direction and the user who is taking a picture faces in the opposite direction. It is a rotation pattern in which the user who is taking a picture captures an image of a target object in front of the user while collecting the voice of the target object.

Thus, the camera 2d and the microphone 4d can be independently rotated, but can also be cooperatively rotated using the switch 7. In this case, the relative position angle between the camera 2d and the microphone 4d can be maintained. That is, when the switch 7 is pressed in the state (a) shown in FIG. 9, the entire rotation unit 8 is cooperatively rotated with the state (the angular difference between the camera 2d and the microphone 4d is 0°) maintained. When the switch 7 is pressed in the state (b) shown in FIG. 9, the entire rotation unit 8 is cooperatively rotated with the state (the angular difference between the camera 2d and the microphone 4d is 180°) maintained.

In the present embodiment, the rotation unit 8 is provided as a coupling portion between the upper body and the lower body forming a folding mobile telephone. However, the present invention is not limited to this configuration, and the rotation unit can be provided in any other positions.

The rotating operation of a camera according to the present embodiment can be applied to the first embodiment of the present invention. That is, in the mobile telephone shown in FIG. 2A, the cameras 2a and 2b can be replaced with the camera 2d shown in FIG. 6. In this case, the gain of the amplifier 14 shown in FIG. 2B can be adjusted continuously or stepwise depending on the rotation angle of the camera 2d.

The rotating operation of a camera according to the present embodiment can also be applied to the second embodiment of the present invention. That is, in the mobile telephone shown in FIG. 3, the cameras 2a and 2b can be replaced with the camera 2d shown in FIG. 6. In this case, the two microphones 4a and 4b can be switched depending on the rotation angle of the camera 2d.

As described above, in a mobile telephone loaded with a communications microphone and a rotatable camera, for capturing an image, and a rotatable microphone, the user can select an independent rotating operation between the camera and the microphone or a cooperative rotating operation between them using a mechanical switch, and the switch can be easily performed.

When they are independently rotated, for example, the voice of a user who is taking a picture can be collected while a target object can be easily switched (from the target in front of the user to the user himself or herself, etc.). When they are cooperatively rotated, the voice of a target object is constantly collected while easily switching into another target object.

In the first, second, third, and fourth embodiments of the present invention, a folding mobile telephone is used. However, the present invention is not limited to this application, but a non-folding mobile telephone can also be used. A camera can capture not only a moving picture, but also a still image.

In the first, second, third, and fourth embodiments of the present invention, the explanation of the present invention has been given based on a mobile telephone, but the present invention can also be applied to many other electronic devices such as a PHS, a PDA, etc.

As described above, according to the present invention, the voice can be clearly and easily collected from all directions when a user who is taking a picture captures an image while facing a target object and facing in other directions.

What is claimed is:

1. A mobile phone comprising:
a display unit mounted on a first side of the mobile phone;
a first camera unit mounted on the first side of the mobile phone for photographing an image capturing target located at the first side of the mobile phone;
a second camera unit mounted on a second side of the mobile phone opposite the first side for photographing an image capturing target located at the second side of the mobile phone;
a microphone unit for collecting a voice of a user talking on the mobile phone and sounds arriving from a nearby area;
a sound processor unit that is equipped with an amplifier and operates so as to execute amplification and A/D conversion processes on the voice and sounds collected by the microphone unit;
a selection unit for selecting one of the first and second camera units;
a camera operation control unit for bringing the selected camera unit selected by the selection unit into an activation ready state; and
a control unit controlling operation of the amplifier equipped in the sound processor unit differently depending on which of the first and second camera units is selected by the selection unit, such that the amplifier achieves a higher gain when the second camera unit is selected than when the first camera unit is selected.

2. A mobile phone comprising:
a display unit mounted on a first side of the mobile phone;
a first camera unit mounted on the first side of the mobile phone for photographing an image capturing target located at the first side of the mobile phone;
a second camera unit mounted on a second side of the mobile phone opposite the first side for photographing an image capturing target located at the second side of the mobile phone;
a first microphone unit mounted on the first side of the mobile phone and collecting a voice of a user talking on the mobile phone and sounds arriving from a nearby area;
a second microphone unit mounted on the second side of the mobile phone and collecting a voice of a user talking on the mobile phone and sounds arriving from a nearby area;
a sound processor unit that is equipped with a first amplifier for the first microphone unit and a second amplifier for the second microphone unit and operates so as to execute amplification and A/D conversion processes on the voice and sounds collected by either the first microphone unit or the second microphone unit;
a selection unit for selecting one of the first and second camera units;
a camera operation control unit for bringing the selected camera unit selected by the selection unit into an activation ready state; and
a control unit for controlling operation of the first and second amplifiers such that when the first camera is selected by the selection unit, the first amplifier achieves a higher gain than that of the second amplifier, and when the second camera is selected by the selection unit, the second amplifier achieves a higher gain than that of the first amplifier.

3. A mobile phone comprising:
a display unit mounted on a first side of the mobile phone;
a first camera unit mounted on the first side of the mobile phone for photographing an image capturing target located at the first side of the mobile phone;
a second camera unit mounted on a second side of the mobile phone opposite the first side for photographing an image capturing target located at the second side of the mobile phone;
a first microphone unit mounted on the first side of the mobile phone and collecting a voice of a user talking on the mobile phone and sounds arriving from a nearby area;
a second microphone unit mounted on the second side of the mobile phone and collecting a voice of a user talking on the mobile phone and sounds arriving from a nearby area;
a sound processor unit that is equipped with a first amplifier for the first microphone unit and a second amplifier for the second microphone unit and operates so as to execute amplification and A/D conversion processes on the voice and sounds collected by either the first microphone unit or the second microphone unit;
a signal processor unit that switches from a muted state to a non-muted state when a signal, level of the voice processed by the sound processor unit exceeds a threshold value;
a selection unit for selecting one of the first and second camera units;
a camera operation control unit for bringing the camera unit selected by the selection unit into an activation ready state; and
a control unit for controlling operation of the first and second amplifiers such that when the first camera is selected by the selection unit, the first amplifier achieves a higher gain than that of the second amplifier, and when the second camera is selected by the selection unit, the second amplifier achieves a higher gain than that of the first amplifier.

4. A mobile phone of a folding type construction, comprising:
an upper-half body and a lower-half body connected by a rotary part unit constituting a joint and capable of rotational movement;
a camera unit for taking a picture of an image capturing target;
a conversation microphone unit for a voice of a user talking on the mobile phone;
a sound collection microphone unit that is activated and deactivated together with the camera unit and is for collecting sounds arriving from a nearby area;
an operation-mode switching unit for switching an operation mode of the rotary part unit between a first mode for allowing the camera unit and the sound collection microphone unit to move rotationally together without changing a relative position between the camera unit and the sound collection microphone unit, and a second mode for allowing the camera unit and the sound collection microphone unit to move rotationally and independently of each other;

a rotated angle determining unit for determining whether the camera unit has been rotated by an angle exceeding an angular region between −90 and +90 degrees form a predetermined angular position by rotational movement of the rotary part unit;

an image data processing unit for changing the direction of the picture taken by the camera unit by +180 or by −180 degrees when the rotated angle determination unit determines that the camera unit has been rotated by an angle exceeding the angular region between −90 and +90 degrees from the predetermined angular position by rotational movement of the rotary part unit.

* * * * *